US010928819B2

(12) United States Patent
Viswanathan (10) Patent No.: US 10,928,819 B2
(45) Date of Patent: Feb. 23, 2021

(54) METHOD AND APPARATUS FOR COMPARING RELEVANT INFORMATION BETWEEN SENSOR MEASUREMENTS

(71) Applicant: HERE Global B.V., Eindhoven (NL)

(72) Inventor: Anirudh Viswanathan, Berkeley, CA (US)

(73) Assignee: HERE GLOBAL B.V., Eindhoven (NL)

( * ) Notice: Subject to any disclaimer, the term of this patent is extended or adjusted under 35 U.S.C. 154(b) by 135 days.

(21) Appl. No.: 16/173,151

(22) Filed: Oct. 29, 2018

(65) Prior Publication Data
US 2020/0130704 A1 Apr. 30, 2020

(51) Int. Cl.
*G05D 1/00* (2006.01)
*G01S 17/931* (2020.01)
*B60W 50/02* (2012.01)
*B60W 50/023* (2012.01)
(Continued)

(52) U.S. Cl.
CPC ......... *G05D 1/0088* (2013.01); *B60W 50/023* (2013.01); *B60W 50/0205* (2013.01); *B60W 60/0015* (2020.02); *G01S 17/931* (2020.01); *G05D 1/0077* (2013.01);
(Continued)

(58) Field of Classification Search
CPC .. G05D 1/0088; G05D 1/0246; G05D 1/0248; G05D 1/0251; G05D 1/0253; G05D 2201/0213; G05D 1/0077; G06K 9/00791; G06K 9/00798; G06K 9/00805; G01S 13/867; G01S 13/89; G01S 17/86;
(Continued)

(56) References Cited

U.S. PATENT DOCUMENTS 9,171,228 B2 10/2015 Mavromatis et al.
9,221,396 B1 * 12/2015 Zhu .................... G06K 9/00791
9,612,123 B1 * 4/2017 Levinson ............... B60Q 1/525
(Continued)

FOREIGN PATENT DOCUMENTS

FR 3062836 A1 * 8/2018

OTHER PUBLICATIONS

Wikipedia article, "Rangefinder", old revision dated Jun. 18, 2018, 6 pages (Year: 2018).*
(Continued)

*Primary Examiner* — Faris S Almatrahi
*Assistant Examiner* — David A Testardi
(74) *Attorney, Agent, or Firm* — Alston & Bird LLP (57) ABSTRACT

A method is provided for comparing relevant information between observations. Methods may include: receiving first sensor data from a first sensor type; receiving second sensor data from a second sensor of a second sensor type, different from the first sensor type, where the first and second sensor data includes data associated with an environment of the sensors; generating a first binary bitmask of the first sensor data; generating a second binary bitmask of the second sensor data; applying a mutual information score function using the first binary bitmask and the second binary bitmask as inputs; generating a mutual information score from the mutual information score function, wherein the mutual information score represents a degree of similarity between the sensor data; and establishing a reliability of the at least one of the first sensor or the second sensor.

20 Claims, 5 Drawing Sheets (51) Int. Cl.
  *G05D 1/02* (2020.01)
  *B60W 60/00* (2020.01)
(52) U.S. Cl.
  CPC ... *G05D 1/0248* (2013.01); *B60W 2050/0215* (2013.01); *G05D 2201/0213* (2013.01)
(58) Field of Classification Search
  CPC ........ G01S 17/87; G01S 17/89; G01S 17/931; B60W 50/025; B60W 60/0015; B60W 2050/0215
  See application file for complete search history.

(56) References Cited

U.S. PATENT DOCUMENTS

| | | | |
|---|---|---|---|
| 9,792,910 | B2 | 10/2017 | Vlietinck et al. |
| 10,317,240 | B1* | 6/2019 | Di Pietro ........... G01C 21/3694 |
| 10,445,599 | B1* | 10/2019 | Hicks ................. G05D 1/0246 |
| 10,452,960 | B1* | 10/2019 | Li ....................... G06K 9/6292 |
| 10,468,062 | B1* | 11/2019 | Levinson ............... G01S 17/89 |
| 10,491,885 | B1* | 11/2019 | Hicks ...................... G01S 17/86 |
| 2007/0005306 | A1* | 1/2007 | Foessel ................ G01S 13/862 702/189 |
| 2013/0058527 | A1* | 3/2013 | Peynot .................... G01S 17/86 382/103 |
| 2015/0103159 | A1* | 4/2015 | Shashua ............. G06K 9/00805 348/118 |
| 2016/0007018 | A1* | 1/2016 | Ooi ....................... H04N 17/002 348/187 |
| 2016/0116593 | A1* | 4/2016 | Kim .......................... B60T 7/22 701/70 |
| 2016/0180177 | A1* | 6/2016 | Nguyen ............. G06K 9/00798 382/104 |
| 2017/0185850 | A1* | 6/2017 | Hsu ................... G06K 9/00805 |
| 2017/0220887 | A1* | 8/2017 | Fathi ................. G06K 9/00201 |
| 2017/0277716 | A1* | 9/2017 | Giurgiu ................ G01C 21/32 |
| 2017/0358102 | A1* | 12/2017 | Akiyama ................ G06T 7/20 |
| 2018/0067489 | A1* | 3/2018 | Oder .................... G05D 1/0255 |
| 2018/0067490 | A1* | 3/2018 | Pollach .............. G06K 9/00979 |
| 2018/0106885 | A1* | 4/2018 | Blayvas ............... G01S 13/931 |
| 2018/0156913 | A1* | 6/2018 | Baba ........................ G01S 7/411 |
| 2018/0182243 | A1* | 6/2018 | Baba ...................... G08G 1/166 |
| 2018/0189575 | A1* | 7/2018 | Liu ........................ G01S 13/867 |
| 2018/0210087 | A1* | 7/2018 | Olson .................... G01S 17/42 |
| 2018/0267544 | A1* | 9/2018 | Lee ........................ G01S 13/931 |
| 2018/0314921 | A1* | 11/2018 | Mercep ................. G01S 13/87 |
| 2018/0349782 | A1* | 12/2018 | Zheng ................... G06N 20/00 |
| 2018/0349784 | A1* | 12/2018 | Zheng ................... G05D 1/0287 |
| 2018/0357493 | A1* | 12/2018 | Takamatsu ............. B60R 21/00 |
| 2018/0372866 | A1* | 12/2018 | Baba .................. G06K 9/00825 |
| 2019/0049566 | A1* | 2/2019 | Adams ................ G01C 21/005 |
| 2019/0066396 | A1* | 2/2019 | Jiang ..................... G01S 13/931 |
| 2019/0303730 | A1* | 10/2019 | Ishii ...................... G06K 9/6215 |
| 2019/0353774 | A1* | 11/2019 | Chondro ............... G01S 13/865 |
| 2019/0387185 | A1* | 12/2019 | Hicks ....................... H04N 5/33 |
| 2020/0055516 | A1* | 2/2020 | Craddock .............. H04N 5/247 |
| 2020/0098394 | A1* | 3/2020 | Levinson ................ G11B 20/18 |

OTHER PUBLICATIONS

Hoang, T. H. et al., *A Bitwise Encoding Scheme Designed to Improve the Speed of Large Scale Gene Set Comparison*, Int'l Conf. Bioinformatics and Computation Biology, BIOCOMP' 15 (2015) 67-73.

Ikeda, K. et al., *Efficient Acceleration of Mutual Information Computation for Nonrigid Registration Using CUDA*, IEEE Journal of Biomedical and Health Informatics, vol. 18, No. 3 (May 2014) 956-968.

Shams, R. et al., *Parallel Computation of Mutual Information on the GPU With Application to Real-Time Registration of 3D Medical Images*, Computer Methods and Programs in Biomedicine 99 (2010) 133-146.

\* cited by examiner

METHOD AND APPARATUS FOR COMPARING RELEVANT INFORMATION BETWEEN SENSOR MEASUREMENTS

TECHNOLOGICAL FIELD

Example embodiments of the present invention relate generally to comparing relevant information between sensor measurements ("observations"), and more particularly, to implementing a discrete-space solution using bitwise operators for efficient computation of a mutual information score representing a comparison result between observations.

BACKGROUND

Road geometry modelling is very useful for three dimensional (3D) map creation and 3D terrain identification along with feature and obstacle detection in environments, each of which may facilitate autonomous vehicle navigation along a prescribed path. Traditional methods for 3D modelling of road geometry and object or feature detection are resource intensive, often requiring significant amounts of human measurement and calculation. Such methods are thus time consuming and costly. Exacerbating this issue is the fact that many modern day applications (e.g., 3D mapping, terrain identification, or the like) require the analysis of large amounts of data, and therefore are not practical without quicker or less costly techniques.

Some current methods rely upon feature detection from image data to perform road terrain detection, but these methods have deficiencies. For instance, some systems designed for terrain and feature detection around a vehicle exist, but may be unreliable. Further, the reliability of feature detection may not be known such that erroneous feature detection or lack of feature detection may adversely impact autonomous or semi-autonomous driving. Over-estimating the accuracy of feature detection may cause safety concerns as object locations may be improperly interpreted as accurate when they are actually inaccurate, while under-estimating accuracy may lead to inefficiencies through overly cautious behaviors.

BRIEF SUMMARY

Accordingly, a method, apparatus, and computer program product are provided for comparing relevant information between sensor measurement observations of an environment from at least two different sensors. In an example embodiment, a method, apparatus and computer program product are provided that establish the features of a road segment for use in guiding autonomous or semi-autonomous vehicles along the road segment.

In a first example embodiment, an apparatus is provided including at least one processor and at least one memory including computer program code. The at least one memory and the computer program code may be configured to, with the at least one processor, cause the apparatus to: receive first sensor data from a first sensor of a first sensor type, where the first sensor data includes data associated with an environment of the first sensor; receive second sensor data from a second sensor of a second sensor type, different from the first sensor type, where the second sensor data includes data associated with an environment of the second sensor; generate a first binary bitmask of the first sensor data; generate a second binary bitmask of the second sensor data; apply a mutual information score using the first binary bitmask and the second binary bitmask as inputs; generate a mutual information score from the mutual information score function, where the mutual information score represents a degree of similarity between the first sensor data and the second sensor data; establish a reliability of at least one of the first sensor and the second sensor based on the mutual information score; and provide for autonomous control of a vehicle using feedback from the at least one of the first sensor and the second sensor in response to the reliability of at least one of the first sensor and the second sensor satisfying a predetermined reliability value.

The first sensor data may correspond to a first image, and the second sensor data may correspond to a second image. Causing the apparatus to apply a mutual information score function using the first binary bitmask and the second binary bitmask as inputs may include causing the apparatus to: generate a joint binary mask between the first binary bitmask and the second binary bitmask by generating a mask value for each corresponding location between the first image and the second image, where the mask value includes the binary value for each of the first image and the second image at each individual corresponding location. The first sensor type may be an image sensor and the second sensor type may be a Light Distancing and Ranging (LiDAR) sensor. The binary bitmask of the first sensor data may be based on colors captured in the first sensor data and the binary bitmask of the second sensor data may be based on intensities captured in the second sensor data.

According to some embodiments, the first sensor and the second sensor are associated with a vehicle traveling along a road segment. The apparatus may be caused to: receive location information associated with the vehicle; determine the road segment along which the vehicle is traveling; and update map data associated with the road segment with at least one of the first sensor data or the second sensor data in response to the mutual information score satisfying a predetermined value. The apparatus may provide updated map data associated with the environment to a map services provider in response to the reliability satisfying a predetermined value. The apparatus may be caused to provide an indication to a user in response to the reliability failing to satisfy a predetermined value.

Embodiments described herein may provide a computer program product including at least one non-transitory computer readable storage medium having computer-executable program code instructions stored therein. The computer-executable program code instructions may include program code instructions to: receive first sensor data from a first sensor of a first sensor type, where the first sensor data includes data associated with an environment of the first sensor; receive second sensor data from a second sensor of a second sensor type, different from the first sensor type, where the second sensor data includes data associated with an environment of the second sensor; generate a first binary bitmask of the first sensor data; generate a second binary bitmask of the second sensor data; apply a mutual information score function using the first binary bitmask and the second binary bitmask as inputs; generate a mutual information score from the mutual information score function, where the mutual information score represents a degree of similarity between the first sensor data and the second sensor data; establish a reliability of at least one of the first sensor and the second sensor based on the mutual information score; and provide for autonomous control of a vehicle using feedback from the at least one of the first sensor and the second sensor in response to the reliability of the at least one of the first sensor and the second sensor satisfying a predetermined reliability value.

The first sensor data may correspond to a first image and the second sensor data may correspond to a second image. The program code instructions to apply a mutual information score function using the first binary bitmask and the second binary bitmask as inputs may include program code instructions to: generate a joint binary mask between the first binary bitmask and the second binary bitmask by generating a mask value for each corresponding location between the first image and the second image, where the mask value includes the binary value for each of the first image and the second image at each individual corresponding location. The first sensor type may be an image sensor and the second sensor type may be a LiDAR sensor. The binary bitmask of the first sensor data may be based on colors captured in the first sensor data from the image sensor while the binary bitmask of the second sensor data may be based on intensities captured in the second sensor data.

The first sensor and the second sensor may be associated with a vehicle traveling along a road segment. The program code instructions may optionally include program code instructions to: receive location information associated with the vehicle; determine the road segment along which the vehicle is traveling; and update map data associated with a road segment with at least one of the first sensor data or the second sensor data in response to the mutual information score satisfying a predetermined value. The computer program product may include program code instructions to provide updated map data associated with the environment to a map services provider in response to the reliability satisfying a predetermined value. The computer program product may include program code instructions to provide an indication to a user in response to the reliability failing to satisfy a predetermined value.

Embodiments described herein may provide a method including: receiving first sensor data from a first sensor type, where the first sensor data includes data associated with an environment of the first sensor; receiving second sensor data from a second sensor of a second sensor type, different from the first sensor type, where the second sensor data includes data associated with an environment of the second sensor; generating a first binary bitmask of the first sensor data; generating a second binary bitmask of the second sensor data; applying a mutual information score function using the first binary bitmask and the second binary bitmask as inputs; generating a mutual information score from the mutual information score function, wherein the mutual information score represents a degree of similarity between the first sensor data and the second sensor data; establishing a reliability of the at least one of the first sensor and the second sensor based on the mutual information score; and providing for autonomous control of a vehicle using feedback from the at least one of the first sensor and the second sensor in response to the reliability of the at least one of the first sensor and the second sensor satisfying a predetermined reliability value.

The first sensor data may correspond to a first image and the second sensor data may correspond to a second image. Applying a mutual information score function using the first binary bitmask and the second binary bitmask as inputs may include: generating a joint binary mask between the first binary bitmask and the second binary bitmask by generating a mask value for each corresponding location between the first image and the second image, where the mask value includes the binary value for each of the first image and the second image at each individual corresponding location. The first sensor type may be an image sensor while the second sensor type may include a LiDAR sensor. The binary bitmask of the first sensor data may be based on colors captured in the first sensor data, where the binary bitmask of the second sensor data may be based on intensities captured in the second sensor data.

The first sensor and the second sensor may be associated with a vehicle traveling along a road segment. The methods may include receiving location information associated with the vehicle; determining the road segment along which the vehicle is traveling; and updating map data associated with a road segment with at least one of the first sensor data or the second sensor data in response to the mutual information score satisfying a predetermined value. Methods may include providing updated map data associated with the environment to a map services provider in response to the reliability satisfying a predetermined value.

Embodiments described herein may provide an apparatus including: means for receiving first sensor data from a first sensor type, where the first sensor data includes data associated with an environment of the first sensor; means for receiving second sensor data from a second sensor of a second sensor type, different from the first sensor type, where the second sensor data includes data associated with an environment of the second sensor; means for generating a first binary bitmask of the first sensor data; generating a second binary bitmask of the second sensor data; means for applying a mutual information score function using the first binary bitmask and the second binary bitmask as inputs; means for generating a mutual information score from the mutual information score function, wherein the mutual information score represents a degree of similarity between the first sensor data and the second sensor data; means for establishing a reliability of the at least one of the first sensor and the second sensor based on the mutual information score; and means for providing for autonomous control of a vehicle using feedback from the at least one of the first sensor and the second sensor in response to the reliability of the at least one of the first sensor and the second sensor satisfying a predetermined reliability value.

The first sensor data may correspond to a first image and the second sensor data may correspond to a second image. The means for applying a mutual information score function using the first binary bitmask and the second binary bitmask as inputs may include: means for generating a joint binary mask between the first binary bitmask and the second binary bitmask by generating a mask value for each corresponding location between the first image and the second image, where the mask value includes the binary value for each of the first image and the second image at each individual corresponding location. The first sensor type may be an image sensor while the second sensor type may include a LiDAR sensor. The binary bitmask of the first sensor data may be based on colors captured in the first sensor data, where the binary bitmask of the second sensor data may be based on intensities captured in the second sensor data.

The first sensor and the second sensor may be associated with a vehicle traveling along a road segment. The apparatus may include means for receiving location information associated with the vehicle; means for determining the road segment along which the vehicle is traveling; and means for updating map data associated with a road segment with at least one of the first sensor data or the second sensor data in response to the mutual information score satisfying a predetermined value. Apparatuses may include means for providing updated map data associated with the environment to a map services provider in response to the reliability satisfying a predetermined value.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having thus described certain example embodiments of the present invention in general terms, reference will hereinafter be made to the accompanying drawings which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment of the present invention for facilitating autonomous and semi-autonomous driving in an environment. Autonomous vehicles leverage sensor information relating to roads to determine safe regions of a road to drive and to evaluate their surroundings as they traverse a road segment. Further, autonomous and semi-autonomous vehicles use high-definition map information to facilitate autonomous driving and to plan autonomous driving routes. These high-definition maps or HD maps are specifically designed and configured to facilitate autonomous and semi-autonomous vehicle control.

HD maps have a high precision at resolutions that may be down to several centimeters that identify objects proximate a road segment, and features of a road segment including lane widths, lane markings, traffic direction, speed limits, lane restrictions, etc. Autonomous and semi-autonomous vehicles use these HD maps to facilitate the autonomous control features, such as traveling within a lane of a road segment at a prescribed speed limit. Autonomous vehicles may also be equipped with a plurality of sensors to facilitate autonomous vehicle control. Sensors may include image sensors/cameras, Light Distancing and Ranging (LiDAR), Global Positioning Systems (GPS), Inertial Measurement Units (IMUs), or the like which may measure the surroundings of a vehicle and communicate information regarding the surroundings to a vehicle control module to process and adapt vehicle control accordingly.

HD maps may be generated and updated based on sensor data from vehicles traveling along road segments of a road network. These vehicles may have various degrees of autonomy and may be equipped with a variety of different levels of sensors. Sensors from fully autonomous vehicles, for example, may be used to update map data or generate new map data in a form of crowd-sourced data from vehicles traveling along road segments. Sensor data received can be compared against other sensor data relating to the images captured by sensors to establish the accuracy of sensor data and to confirm the position, size, shape, etc. of features and objects along the road segment. According to some embodiments, vehicles may include multiple sensors and may seek to compare the data between the different sensors and/or sensor types to determine how closely they match. Determining how closely the image of a first sensor matches the image of a second sensor may be useful in a variety of ways to confirm sensor accuracy, to confirm map data, to measure sensor disparity, etc.

Embodiments described herein may broadly relate to computer vision when there is a need to compare multiple observations of an environment. The term "observations" as used herein refers to sensor measurements of an environment. For example, two images may require comparison to establish how visually similar they are. Several metrics, such as correlation, Euclidian distance, histogram intersection, etc. can be employed. However, when the observations arise from data generated using two different sensors, such as a camera image that is to be compared against LiDAR data, traditional comparison approaches do not work.

Using an image sensor such as a camera, a sensor may capture an image including colors and shadows, whereas a LiDAR image may include intensities of depth that do not directly correlate with the colors and shadows observed in the camera image. Conventional correlation methods cannot establish a correlation between these images. In order to overcome this issue, embodiments described herein use a mutual information metric. A mutual information metric may be representative of the amount of overlap may be measured in the form of an entropy function can be directly determined and does not require the observations to come from the same sensor. Through an accurate method of comparing images from different sensors, embodiments described herein can more readily and accurately establish the accuracy of features in an environment and to assess the reliability of map data and accuracy between sensors.

Figure 1:
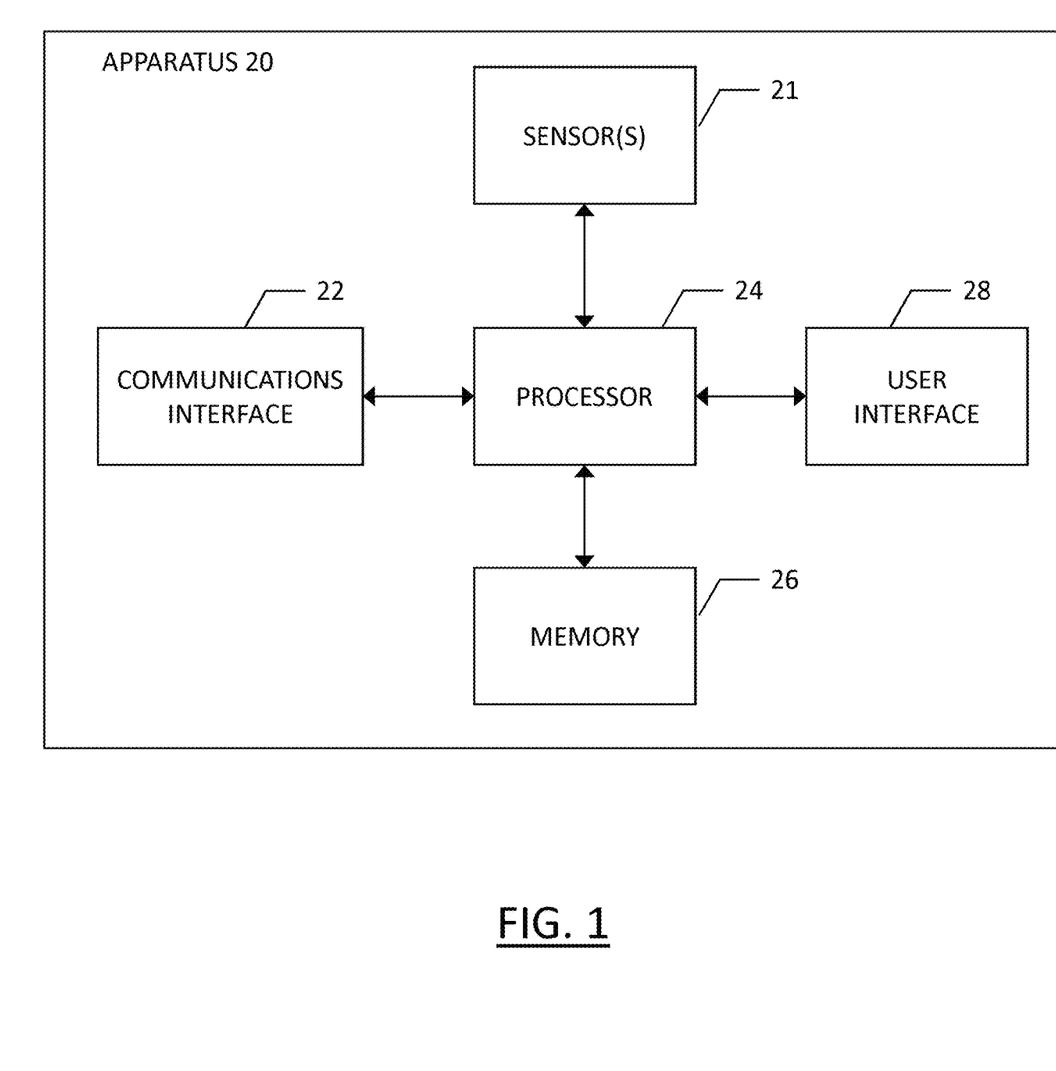
FIG. 1 is a block diagram of an apparatus according to an example embodiment of the present disclosure.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for providing advanced driver assistance features which may include a navigation system user interface. For example, the computing device may be an Advanced Driver Assistance System module (ADAS) which may at least partially control autonomous or semi-autonomous features of a vehicle. However, as embodiments described herein may optionally be used for map generation, map updating, and map accuracy confirmation, embodiments of the apparatus may be embodied or partially embodied as a mobile terminal, such as a personal digital assistant (PDA), mobile telephone, smart phone, personal navigation device, smart watch, tablet computer, camera or any combination of the aforementioned and other types of voice and text communications systems. In a preferred embodiment where some level of vehicle autonomy is involved, the apparatus 20 is embodied or partially embodied by an electronic control unit of a vehicle that supports safety-critical systems such as the powertrain (engine, transmission, electric drive motors, etc.), steering (e.g., steering assist or steer-by-wire), and braking (e.g., brake assist or brake-by-wire). Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped or associated with any number of sensors 21, such as a global positioning system (GPS), accelerometer, LiDAR, radar, and/or gyroscope. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device such as the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like). In this regard, the apparatus 20 may interpret positioning data collected by its sensors and provide a destination preview including visual and audio feedback, to a user, for example.

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication and/or may alternatively support vehicle to vehicle or vehicle to infrastructure wireless links.

The apparatus 20 may support a mapping or navigation application so as to present maps or otherwise provide navigation or driver assistance, such as in an example embodiment in which map data is created or updated using methods described herein. For example, the apparatus 20 may provide for display of a map and/or instructions for following a route within a network of roads via user interface 28. In order to support a mapping application, the computing device may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, LiDAR, ultrasonic and/or infrared sensors.

In example embodiments, a navigation system user interface may be provided to provide driver assistance to a user traveling along a network of roadways whose geometry and details may be generated and/or updated according to methods described herein. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like. Identifying objects along road segments or road links that a vehicle may traverse may provide information useful to navigation and autonomous or semi-autonomous vehicle control by establishing barriers defining roadway width, identifying roadway curvature, or any boundary related details of the road links that may be traversed by the vehicle.

Figure 2:
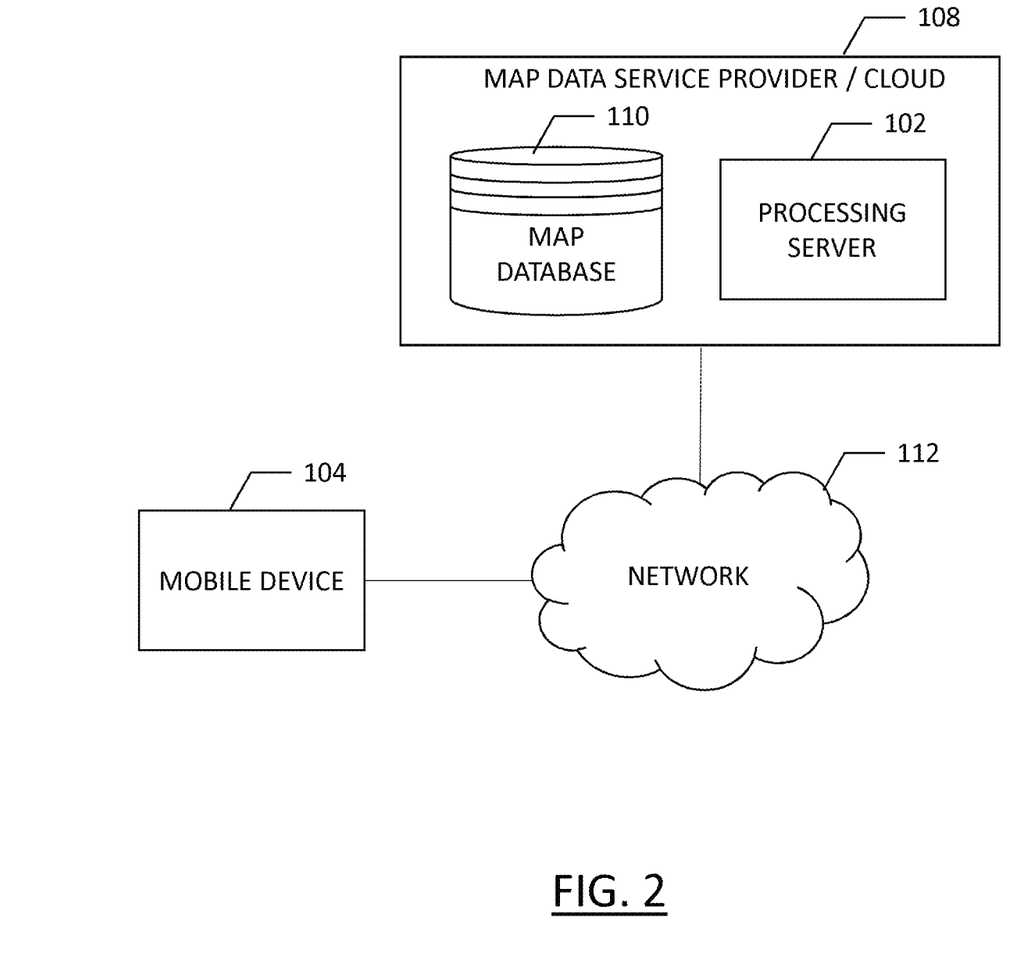
FIG. 2 is a block diagram of a system for comparing relevant information between sensor measurement observations according to an example embodiment of the present disclosure.

A map service provider database may be used to provide driver assistance via a navigation system and/or through an ADAS having autonomous or semi-autonomous vehicle control features. FIG. 2 illustrates a communication diagram of an example embodiment of a system for implementing example embodiments described herein. The illustrated embodiment of FIG. 2 includes a mobile device 104, which may be, for example, the apparatus 20 of FIG. 2, such as a mobile phone, an in-vehicle navigation system, an ADAS, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may provide cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device 104, as they travel the roads throughout a region.

The map database 110 may be a master map database, such as an HD map database, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an Advanced Driver Assistance System (ADAS) which may include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of useful driver assistance information, according to some example embodiments.

Autonomous driving has become a focus of recent technology with recent advances in machine learning, computer vision, and computing power able to conduct real-time mapping and sensing of a vehicle's environment. Such an understanding of the environment enables autonomous driving in two distinct ways. Primarily, real-time or near real-time sensing of the environment may provide information about potential obstacles, the behavior of others on the roadway, and areas that are navigable by the vehicle. An understanding of where other cars are and what they may do is critical for a vehicle (or apparatus 20) to safely plan a route. Further, vehicles must be able to avoid both static and dynamic obstacles, which may change presence and position in real-time. Autonomous vehicles must also have a semantic understanding of what areas are around them that are navigable and safe for driving. Maps, such as HD maps described above, of areas may exist with very high levels of granularity to help facilitate navigation for autonomous vehicles; however, exceptions will occur in which a vehicle may need to deviate from a roadway to avoid a collision or where a road's geometry or other map attributes (e.g., direction) have changed.

Another key to autonomous driving are vision techniques for localization with respect to a map of reference landmarks. This enables the understanding of a position and heading with respect to a roadway. On a coarse scale, navigation maps allow vehicles to know what roads to use to reach a particular destination. On a finer scale, maps allow vehicles to know what lanes to be in and when to make lane changes. This information is essential for planning an efficient and safe route as driving involves complex situations and maneuvers which need to be executed in a timely fashion, and often before they are visually obvious (e.g., a vehicle around a corner is stopped). Localization with respect to a map enables the incorporation of other real-time information into route planning. Such information can include traffic, areas with unsafe driving conditions (e.g., ice, weather, pot holes, etc.) and temporary road changes, such as may be caused by construction.

Autonomous vehicle navigation relies heavily on GPS which can provide a real-time location with a 95% confidence interval of 7.8 meters according to the standards set by governing agencies. However, in complex urban environments, reflection of GPS signals in "urban canyons" can increase the error such that location may be off by as much as 30 meters or more. Given that the width of many vehicle lanes is typically four meters or less, this accuracy is insufficient to properly localize an autonomous vehicle to enable safe route planning decisions. Other sensors, such as inertial measurement units (IMUs) can increase the accuracy of localization by taking into account vehicle movement, but these sensors may drift and fail to provide sufficient accuracy to ensure maximum safety.

Autonomous vehicle navigation requires localization accuracy, and accuracy to within 10 centimeters may provide sufficient accuracy for safety and effectiveness of autonomous navigation. One way to achieve this level of accuracy, as described herein, is through the use of visual odometry, in which features of the environment are detected from imagery. These features detected in the environment can then be matched to a database of features to establish a location. Further, an understanding of the accuracy of onboard sensors is imperative to autonomous driving control to establish the degree of reliance autonomous controls may have on the sensors detecting the environment of a vehicle. Additionally, sensors on board a vehicle may compare captured or sensed images of an environment to establish the accuracy of a map database, such as map database 110, with respect to the environment of the vehicle. This accuracy may also be used to determine a degree to which a vehicle may rely on the accuracy of the stored map data.

Visual odometry can be used to determine various features within an environment, such as lane lines of a road to establish the lanes of the road and the boundaries thereof. Lane feature detection algorithms may be used in this regard; however, measurement of their performance may be necessary to ensure accuracy and repeatability. Described herein is a method of establishing a degree of mutual information between images captured or sensed by sensors of different types. While the methods described herein could be used to establish the accuracy of sensors, accuracy of map data, and accuracy of locationing of a variety of features, example embodiments are described primarily with respect to establishing a degree of mutual information between disparate sensors of a similar environment.

Autonomous vehicles or vehicles with some level of autonomous controls provide some degree of vehicle control that was previously performed by a person driving a vehicle. Removing some or all of the responsibilities of driving from a person and automating those responsibilities require a high degree of confidence in performing those responsibilities in a manner at least as good as a human driver. For example, maintaining a vehicle's position within a lane by a human involves steering the vehicle between observed lane markings and determining a lane when lane markings are faint, absent, or not visible due to weather (e.g., heavy rain, snow, bright sunlight, etc.). A vehicle with autonomous capability to keep the vehicle within a lane as it travels along a road segment must also be able to identify the lane based on the lane markings or other features that are observable. As such, the autonomous vehicle must be equipped with sensors sufficient to observe road features, and a controller that is capable of processing the signals from the sensors observing the road features, interpret those signals, and provide vehicle control to maintain the lane position of the vehicle based on the sensor data. Maintaining lane position is merely one illustrative example of a function of autonomous or semi-autonomous vehicles that demonstrates the sensor level and complexity of autonomous driving. However, autonomous vehicle capabilities, particularly in fully autonomous vehicles, must be capable of performing all driving functions. As such, the vehicles must be equipped with sensor packages that enable the functionality in a safe manner.

Autonomous and semi-autonomous vehicles may use a variety of sensors to facilitate various autonomous functions. For example, adaptive cruise control functionality that maintains a following distance from a lead vehicle, and maintains a near-constant speed when not following another vehicle, requires at least sensors (e.g., sensors 21 of FIG. 1) that can detect a vehicle in front of the autonomous or semi-autonomous vehicle. Such a sensor may be a distance sensor such as LiDAR or other sensor having similar capabilities. Further, the autonomous or semi-autonomous vehicle must be equipped with control capabilities to facilitate braking of the vehicle and accelerating the vehicle. This sensor and control system may be a "sensor package" or level of sensor capabilities. Adaptive cruise control has become relatively common, such that a sensor package capable of adaptive cruise control may be a relatively rudimentary level of sensor capabilities relative to a vehicle that has full autonomous control.

Beyond adaptive cruise control, vehicles with more autonomy may be able to navigate roadways through lane changes, turns, stopping, starting, and generally performing all features of conventional driving that historically have been performed manually by a driver. In order to facilitate full autonomy, vehicles require a level of sensor capabilities that can identify road geometry, lane lines, other vehicles, pedestrians, objects in or proximate the roadway, signs, road anomalies (e.g., temporary construction barricades), etc. Such an advanced sensor package having a high level of sensor capabilities may be capable of full autonomous control of a vehicle in a manner that substantially replaces the driver. It is also appreciated that any degree of autonomy between no autonomy and full autonomy is also possible based on a sensor package installed in a vehicle or carried with a vehicle and a level of sensor capabilities of the sensor package.

Beyond sensors on a vehicle, autonomous and semi-autonomous vehicles may use HD maps to help navigate and to control a vehicle along its path. These HD maps may provide road geometry, lane geometry, road segment restrictions (e.g., speed limits), lane restrictions (e.g., turn-only lanes), and any other information that may be related to the road segments of a road network. Further, HD maps may be dynamic and may receive updates periodically from map services providers which may be informed by vehicles traveling along the road segments with sensor packages able to identify and update the HD maps. Further, properties of road segments may change at different times of day or different days of the week, such as express lanes which may be in a first direction of travel at a first time of day, and a second direction of travel at a second time of day. HD maps may include this information to provide accurate navigation and to facilitate autonomy along these road segments to supplement a sensor package associated with a vehicle.

According to example embodiments described herein, the role of HD maps in facilitating autonomous or semi-autonomous vehicle control may include crowd-sourced building of the maps to identify and confirm features of the maps. In the context of map-making, the features from the environment may be detected by a vehicle traveling along a road segment and consolidated to form a representation of the actual real-world environment in the form of a map. Embodiments described herein include a method, apparatus, and computer program product to use noisy detection results on raw sensor data to perform efficient consolidation and minimize any domain-specific knowledge on the detections to generate the map.

Vehicles traveling along a road segment may be equipped with sensors, such as sensors 21 of apparatus 20 of FIG. 1, where the sensors may include image sensors and distance sensors (e.g., LiDAR sensor or other three-dimensional sensor). These sensors may be used to detect features of an environment to facilitate autonomous and semi-autonomous driving. The sensors may be part of a detection module or perception module which may feature a plurality of sensors to obtain a full interpretation of the environment of the module and the vehicle associated therewith. To ensure accurate interpretation of the environment, sensor data may be compared against other sensor data with a degree of mutual information established to provide a level of confidence to enable autonomous vehicle control reliably. The computation of mutual information from disparate image sources is combinatorial and requires high processing power to scan the entire raster space between the two observations to determine an extent of overlap of corresponding features. Thus, the metric of mutual information may be of limited practical use in real-time context. Embodiments described herein include a method to improve the efficiency and reduce latency of the computation of a mutual information score making it amenable to a real-time use case to compare the similarity between two observations of an environment.

The mutual information (I(X,Y)) function may be represented as follows:

$$I(X;Y) = \sum_{y \in Y}\sum_{x \in X} p(x,y) \log\left(\frac{p(x,y)}{p(x)p(y)}\right), \quad \text{(Eq. 1)}$$

where the random variables X, Y span the entire domain of the observation space. For instance, in the case of a binary image, the range of pixel intensities are {0,1}. The joint probability distribution P(x,y) represents the normalized count of values at a specific location. In order to compute the joint histogram, both the observations need to be sequentially scanned resulting in a combinatorial space of all possible values for the joint distribution, after which the mutual information score may be computed. The sequential scan and the combinational search space may be computationally expensive, rendering this function difficult to use for real-time generation of a mutual information score. Embodiments described herein improve the efficiency and speed with which the mutual information score is computed.

Embodiments of the present disclosure include a discrete-space solution using bitwise operators for efficient computation of the mutual information score. By quantizing the observation space, and efficiently operating on the entire observation-space in place, the mutual information score reduces to fast bitwise operations that enable the score to be computed in real time providing distinct advantages over conventional techniques.

An example embodiment described herein may include where the input observations space is discrete in nature, such as camera images or LiDAR intensities. In order to compare relevant information between the observations, the input space may be transformed by a perception system configured to detect features in an environment. A perception system may be trained through machine learning to be able to accurately and repeatably identify objects of interest or features in an environment. The outputs of the perception system, in the simplest form, may be binary masks that highlight regions of interest in each observation. For the mapping use case, such regions of interest may correspond to lane lines, road signs, and other features of a road segment. In order to compare the two observations, a comparison of the binary masks of the two observations may be performed. The masks may have additional quantization levels; however, the binary mask example is used to illustrate the fundamental concept.

Figure 3:
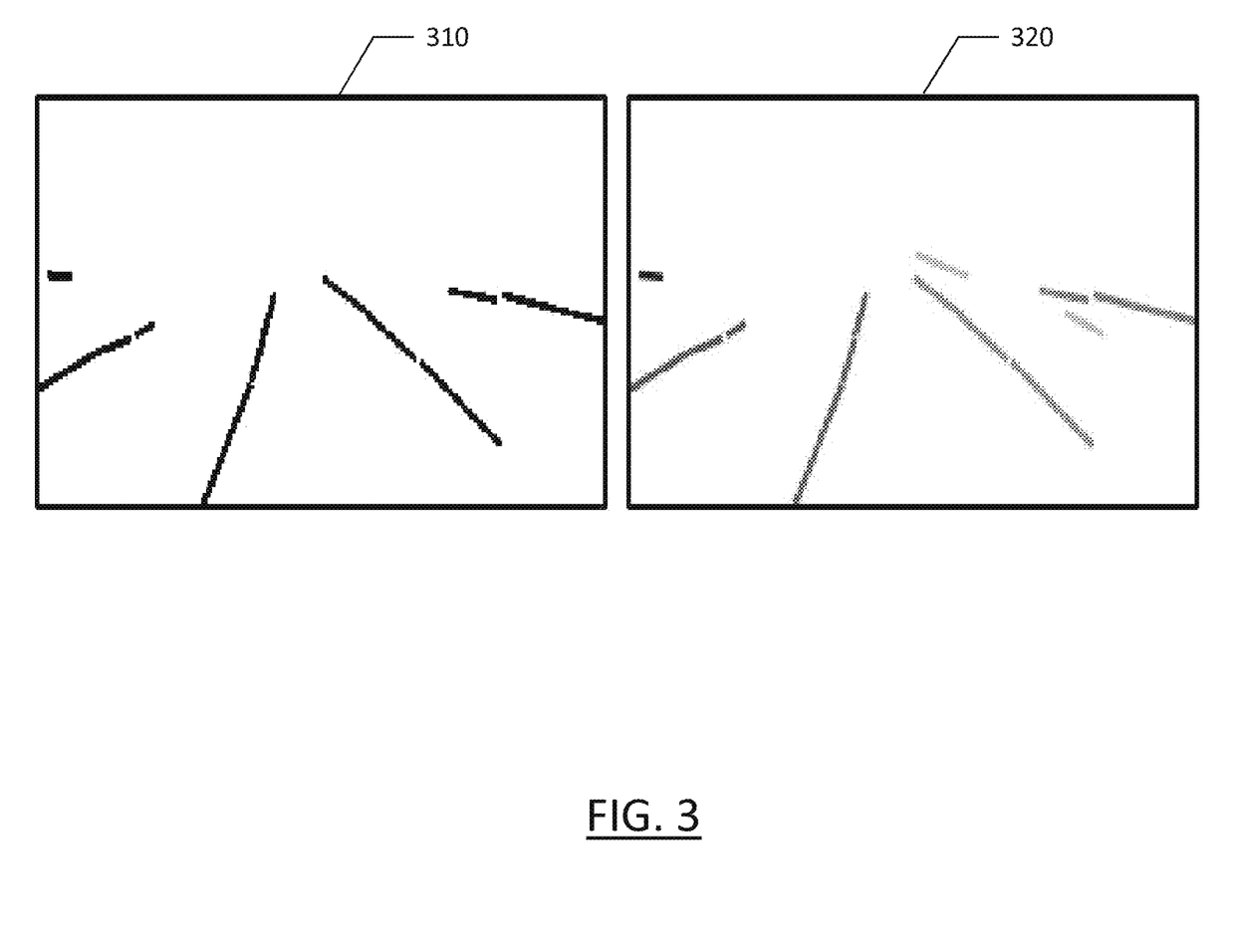
FIG. 3 illustrates two different sensor measurement observations captured by two sensors of two different types according to an example embodiment of the present disclosure.

FIG. 3 illustrates two observations shown as images: 310 and 320. These images represent observations from two separate sensors. One sensor may be, for example, a camera capturing an image, while another sensor may be a LiDAR sensor capturing depth of field. A mutual information metric quantifies how similar the content of the images are. The mutual information metric is distinct from a correlation score which may not properly capture the degree to which images are similar if elements are not properly correlated with one another through matching errors. The mutual information score function, in which the joint distribution P(x,y) can be interpreted to correspond to counts where the observations are 0, 1, or where both have dissimilar values (e.g., one image binary mask may have a zero at a specific location while the other image binary mask has a 1 at the same location).

To compute the joint histogram, binary masks for each of the observations may be generated.

Mask {00}—corresponds to the bitwise sum when observations 1 and 2 have zeros at location (x,y)
Mask {01}—corresponds to the bitwise sum when observations 1 and 2 have (0,1) at location (x,y)
Mask {10}—corresponds to the bitwise sum when observations 1 and 2 have (1,0) at location (x,y)
Mask {11}—corresponds to the bitwise sum when observations 1 and 2 have ones at location (x,y).

Computing the mask may be a bitwise operation and a constant time operation instead of a linear scan used to compute a mutual information score in a standard implementation. The values for P(x) and P(y) can be directly obtained from summing the columns and rows of the joint-distribution. The standard linear scan that would have required linear time to search through each observation space is thus reduced to a constant time compute operation that is considerably more efficient and requires less processing capacity to compute. The final mutual information score may then be computed as the values for the full joint-distribution and individual distributions are determined.

Figure 4:
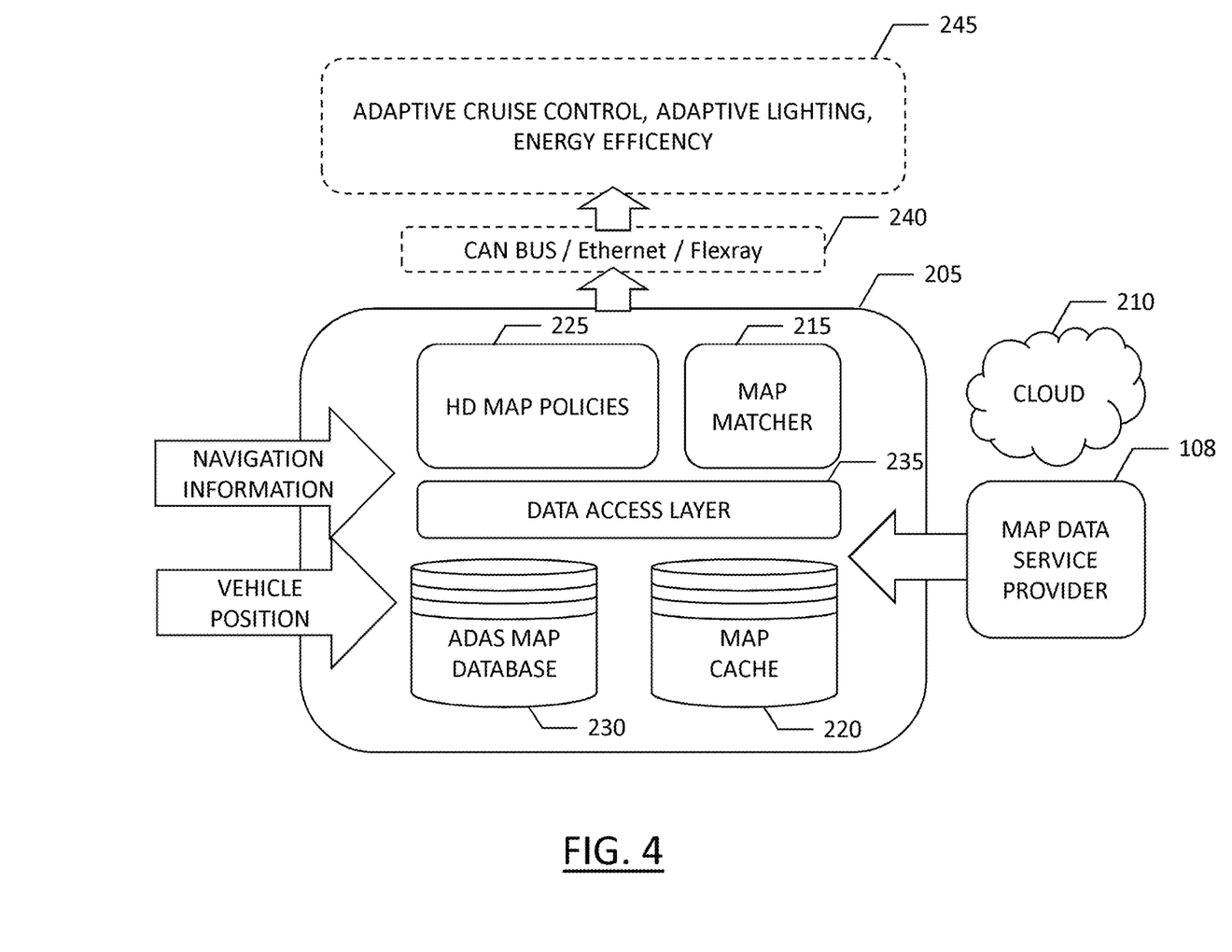
FIG. 4 is a block diagram of a system for implementing the methods described herein for comparing relevant information between sensor measurement observations according to an example embodiment of the present disclosure.

FIG. 4 illustrates an example embodiment of an architecture specifically configured for implementing embodiments described herein. The illustrated embodiment of FIG. 4 may be vehicle-based, where sensor data is obtained from sensors of a vehicle traveling along a road segment. The location of the collected sensor data along the road segment may be determined through location determination using GPS or other locationing means and correlated to map data of map data service provider 108. As illustrated, the architecture includes a map data service provider 108 that provides map data (e.g., HD maps and policies associated with road links within the map) to the Advanced Driver Assistance System (ADAS) 205, which may be vehicle-based or server based depending upon the application. The map data service provider may be a cloud-based 210 service. The ADAS receives navigation information and vehicle position and may use that information to map-match 215 the position to a road link on a map of the mapped network of roads stored in the map cache 220. This link or segment, along with the direction of travel, may be used to establish which HD map policies are applicable to the vehicle associated with the ADAS, including sensor capability information, autonomous functionality information, etc. Accordingly, policies for the vehicle are established based on the current location and the environmental conditions (e.g., traffic, time of day, weather). The HD map policies associated with the road segment specific to the vehicle are provided to the vehicle control, such as via the CAN (computer area network) BUS (or Ethernet or Flexray) 240 to the electronic control unit (ECU) 245 of the vehicle to implement HD map policies, such as various forms of autonomous or assisted driving, or navigation assistance.

A vehicle traveling along a road segment may receive sensor data from a plurality of sensors used to capture data relating to the surrounding environment. A vehicle with autonomous or semi-autonomous control may detect features in the environment of the vehicle to facilitate the autonomous or semi-autonomous control. Sensor redundancy may be used to provide additional confirmation relating to features and objects of the environment and to improve detection and reliability of vehicle interpretation of the surrounding environment. The sensor redundancy may be capitalized by comparing the sensed data from multiple sensors to increase the reliability of feature detection in the environment and to ensure that the sensors are operating reliably. As such, mutual information may be obtained and measured from the sensor data as described above. The mutual information score derived from the mutual score function may inform the vehicle of the reliability and accuracy of the sensor data relating to the environment. This may, in turn, provide a confidence level to the vehicle for autonomous and semi-autonomous control.

Figure 5:
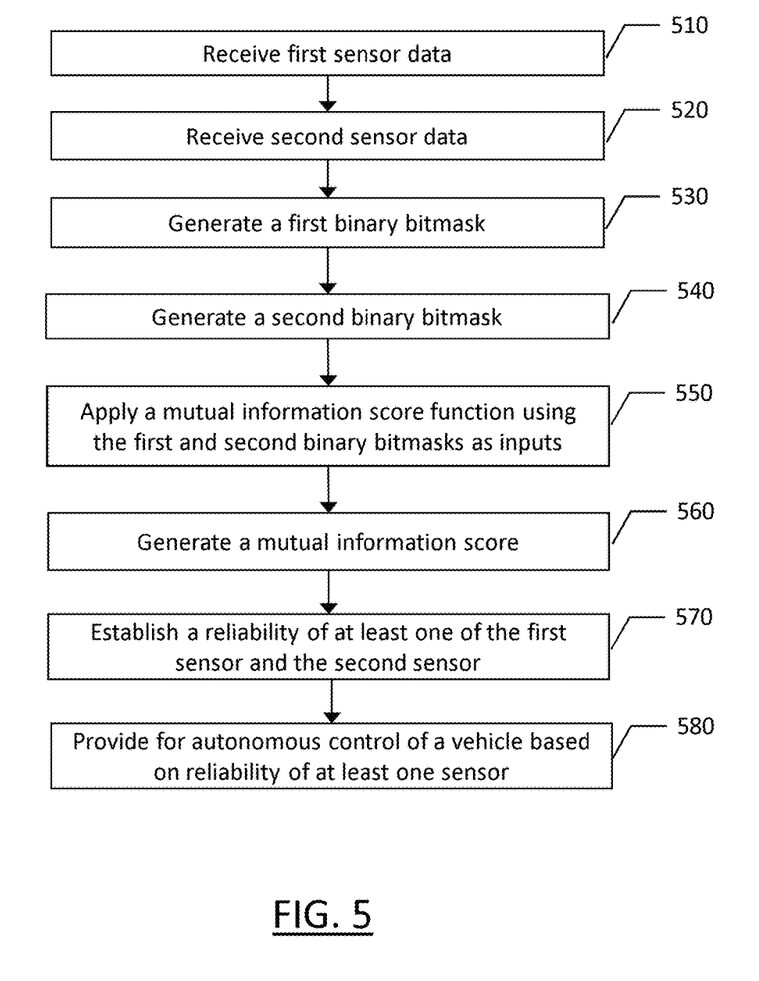
FIG. 5 is a flowchart of operations for comparing relevant information between sensor measurement observations according to an example embodiment of the present disclosure.

FIG. 5 illustrates a flowchart depicting a method according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 5 is a flowchart of a method for comparing relevant information between observations of an environment. As shown, first sensor data from a first sensor of a first sensor type may be received at 510 while second sensor data from a second sensor of a second sensor type may be received at 520. The first sensor type may be different from the second sensor type where the sensor data generated from each may be disparate and not readily comparable. A first binary bitmask may be generated from the first sensor data at 530 and a second binary bitmask may be generated from the second sensor data at 540. A mutual information score function is applied as shown at 550 using the first binary bitmask and the second binary bitmask as inputs. A mutual information score is generated from the mutual information score function at 560. A reliability of at least one of the first sensor and the second sensor is established at 570, and based on that reliability, embodiments described herein provide for autonomous control of a vehicle as shown at 580.

In an example embodiment, an apparatus for performing the method of FIG. 5 above may comprise a processor (e.g., the processor 24) configured to perform some or each of the operations (510-580) described above. The processor may, for example, be configured to perform the operations (510-580) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-580 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus to facilitate autonomous or semi-autonomous control of a vehicle comprising at least one processor and at least one non-transitory memory including computer program code instructions, the computer program code instructions configured to, when executed, cause the apparatus to at least:
   receive first sensor data from a first sensor of a first sensor type, wherein the first sensor data comprises data associated with an observation of an environment of a field of view of the first sensor;
   receive second sensor data from a second sensor of a second sensor type, different from the first sensor type, wherein the second sensor data comprises data associated with an observation of an environment of a field of view of the second sensor;
   generate a first binary bitmask of the first sensor data;
   generate a second binary bitmask of the second sensor data;
   apply a mutual information score function using the first binary bitmask and the second binary bitmask as inputs;
   generate a mutual information score from the mutual information score function, wherein the mutual information score represents a degree of similarity between the first sensor data and the second sensor data;
   establish a reliability of at least one of the first sensor or the second sensor based on the mutual information score; and
   provide autonomous control of a vehicle using feedback from the at least one of the first sensor and the second sensor in response to the reliability of the at least one of the first sensor or the second sensor satisfying a predetermined reliability value.

2. The apparatus of claim 1, wherein the first sensor data corresponds to a first image, wherein the second sensor data corresponds to a second image, and wherein causing the apparatus to apply a mutual information score function using the first binary bitmask and the second binary bitmask as inputs comprises causing the apparatus to:

generate a joint binary mask between the first binary bitmask and the second binary bitmask by generating a mask value for each corresponding location between the first image and the second image, wherein the mask value includes the binary value for each of the first image and the second image at each individual corresponding location.

3. The apparatus of claim 1, wherein the first sensor type is an image sensor, and the second sensor type is a Light Distancing and Ranging (LiDAR) sensor.

4. The apparatus of claim 3, wherein the binary bitmask of the first sensor data is based on colors captured in the first sensor data, wherein the binary bitmask of the second sensor data is based on intensities captured in the second sensor data.

5. The apparatus of claim 1, wherein the first sensor and the second sensor are associated with a vehicle traveling along the road segment, wherein the apparatus is further caused to:
receive location information associated with the vehicle;
determine the road segment along which the vehicle is traveling; and
update map data associated with a road segment with at least one of the first sensor data or the second sensor data in response to the mutual information score satisfying a predetermined value.

6. The apparatus of claim 1, wherein the apparatus is further caused to provide updated map data associated with the environment to a map services provider in response to the reliability satisfying a predetermined value.

7. The apparatus of claim 1, wherein the apparatus is further caused to provide an indication to a user in response to the reliability failing to satisfy a predetermined value.

8. A computer program product comprising at least one non-transitory computer-readable storage medium having computer-executable program code instructions stored therein, the computer-executable program code instructions comprising program code instructions to:
receive first sensor data from a first sensor of a first sensor type, wherein the first sensor data comprises data associated with an environment of the first sensor;
receive second sensor data from a second sensor of a second sensor type, different from the first sensor type, wherein the second sensor data comprises data associated with an environment of the second sensor;
generate a first binary bitmask of the first sensor data;
generate a second binary bitmask of the second sensor data;
apply a mutual information score function using the first binary bitmask and the second binary bitmask as inputs;
generate a mutual information score from the mutual information score function, wherein the mutual information score represents a degree of similarity between the first sensor data and the second sensor data;
establish a reliability of at least one of the first sensor or the second sensor based on the mutual information score; and
provide autonomous control of a vehicle using feedback from the at least one of the first sensor or the second sensor in response to the reliability of the at least one of the first sensor and the second sensor satisfying a predetermined reliability value.

9. The computer program product of claim 8, wherein the first sensor data corresponds to a first image, wherein the second sensor data corresponds to a second image, and wherein the program code instructions to apply a mutual information score function using the first binary bitmask and the second binary bitmask as inputs comprise program code instructions to:
generate a joint binary mask between the first binary bitmask and the second binary bitmask by generating a mask value for each corresponding location between the first image and the second image, wherein the mask value includes the binary value for each of the first image and the second image at each individual corresponding location.

10. The computer program product of claim 8, wherein the first sensor type is an image sensor, and the second sensor type is a Light Distancing and Ranging (LiDAR) sensor.

11. The computer program product of claim 10, wherein the binary bitmask of the first sensor data is based on colors captured in the first sensor data, wherein the binary bitmask of the second sensor data is based on intensities captured in the second sensor data.

12. The computer program product of claim 8, wherein the first sensor and the second sensor are associated with the vehicle traveling along a road segment, further comprising program code instructions to:
receive location information associated with the vehicle;
determine the road segment along which the vehicle is traveling; and
update map data associated with a road segment with at least one of the first sensor data or the second sensor data in response to the mutual information score satisfying a predetermined value.

13. The computer program product of claim 8, further comprising program code instructions to provide updated map data associated with the environment to a map services provider in response to the reliability satisfying a predetermined value.

14. The computer program product of claim 8, further comprising program code instructions to provide an indication to a user in response to the reliability failing to satisfy a predetermined value.

15. A method comprising:
receiving first sensor data from a first sensor of a first sensor type, wherein the first sensor data comprises data associated with an environment of the first sensor;
receiving second sensor data from a second sensor of a second sensor type, different from the first sensor type, wherein the second sensor data comprises data associated with an environment of the second sensor;
generating a first binary bitmask of the first sensor data;
generating a second binary bitmask of the second sensor data;
applying a mutual information score function using the first binary bitmask and the second binary bitmask as inputs;
generating a mutual information score from the mutual information score function, wherein the mutual information score represents a degree of similarity between the first sensor data and the second sensor data;
establishing a reliability of at least one of the first sensor or the second sensor based on the mutual information score; and
providing autonomous control of a vehicle using feedback from the at least one of the first sensor and the second sensor in response to the reliability of the at least one of the first sensor or the second sensor satisfying a predetermined reliability value.

16. The method of claim 15, wherein the first sensor data corresponds to a first image, wherein the second sensor data corresponds to a second image, and wherein applying a mutual information score function using the first binary bitmask and the second binary bitmask as inputs comprises:
generating a joint binary mask between the first binary bitmask and the second binary bitmask by generating a mask value for each corresponding location between the first image and the second image, wherein the mask value includes the binary value for each of the first image and the second image at each individual corresponding location.

17. The method of claim 15, wherein the first sensor type is an image sensor, and the second sensor type is a Light Distancing and Ranging (LiDAR) sensor.

18. The method of claim 17, wherein the binary bitmask of the first sensor data is based on colors captured in the first sensor data, and wherein the binary bitmask of the second sensor data is based on intensities captured in the second sensor data.

19. The method of claim 15, wherein the first sensor and the second sensor are associated with the vehicle traveling along a road segment, the method further comprising:
receiving location information associated with the vehicle;
determining the road segment along which the vehicle is traveling; and
updating map data associated with a road segment with at least one of the first sensor data or the second sensor data in response to the mutual information score satisfying a predetermined value.

20. The method of claim 15, further comprising providing updated map data associated with the environment to a map services provider in response to the reliability satisfying a predetermined value.

* * * * *